United States Patent Office 3,778,367
Patented Dec. 11, 1973

3,778,367
TREATMENT OF PROCESS WATER
Robert D. Pruessner, Houston, Tex., assignor to Petro-Tex Chemical Corporation, Houston, Tex.
No Drawing. Filed Sept. 22, 1971, Ser. No. 182,908
Int. Cl. C02b 1/20
U.S. Cl. 210—51   18 Claims

ABSTRACT OF THE DISCLOSURE

Separation of emulsifiers which are salts of the condensation product of naphthalene sulfonic acid and formaldehyde from process water by contacting the process water with an amine having at least two amine groups separated by an aliphatic radical having no more than 5 carbon atoms with the separation being made at a pH of less than 7.0. For example, polychloroprene is produced by emulsion polymerization using said salts as surfactants with the salts being washed out into process water which is contacted with polyethyleneamine and the pH of mixture lowered to 4.0 to effect separation of said salt.

Neoprene, or polychloroprene, is conventionally polymerized in emulsion polymerization utilizing a combination of emulsifying agents. Conventionally, emulsifying agents are such as rosin acid salts and various secondary emulsifiers. Some of the emulsifying agents may remain in the polymer but certain water soluble emulsifiers are substantially removed before final isolation and processing of the polymer. These emulsifiers that are removed are sometimes referred to as secondary emulsifiers. For example, the polymer may be recovered by coagulation of the latices and thereafter the water soluble emulsifiers removed before final milling. The water soluble emulsifiers are removed for example, by washing the polymer with warm water on a wash belt. This washing may be assisted by extraction by use of solvents. Normally, the washing requires the use of large volumes of water and if the emulsifying agents are biodegradable this water may be processed by bio-oxidative degradation; however, if the wash water contains non-biodegradable emulsifying agents this presents a major problem because of the restrictions on the releasing of significant amounts of organic compounds into streams and rivers. It is an object of this invention to remove certain non-biodegradable emulsifiers from neoprene process water or other water containing these emulsifiers.

In the polymerization of chloroprene, it has been the practice to frequently include as one of the emulsifiers a salt of the condensate product of naphthalene sulfonic acids and formaldehyde such as disclosed in U.S. Pats. 2,046,757 and 2,264,173. Examples of emulsifiers of this type are sold under the trade names of Lomar PW produced by Nopco and Daxad-15 produced by W. R. Grace. This type of emulsifier is employed to increase the stability of latices especially when the emulsion contains high concentration of electrolytes or in instances in which the other emulsifying agents are poor dispersing agents for the solid polymer. The formaldehyde-naphthalene sulfonic acid condensation product salts are excellent emulsifiers and, accordingly, have been incorporated in commercial recipes. However, these emulsifiers are washed out of the polymer and are for practical purposes relatively non-biodegradable because the aromatic portion of the salt renders it immune or very resistant to bacteriological decay. Thus, it was a principal object of this invention to provide a method for separating this particular type of emulsifier from neoprene process water after polymerization. For convenience, in this application these surfactants are sometimes referred to as "condensation product salts" but it is understood that this refers to the salts of the condensation product of naphthalene sulfonic acid and formaldehyde.

The separation of the emulsifiers from process water presents significant problems. In the first place the emulsifiers are present in a very small percentage based on the volume of water and thus any method for separation must be highly efficient. Further the process water usually contains other materials such as neoprene latex and other emulsifiers or additives and the method of separation must operate efficiently in the presence of the other materials.

According to this invention it has been discovered that the salts of the condensation products of naphthalene sulfonic acids and formaldehyde can be efficiently and effectively separated from aqueous compositions by contacting the aqueous composition with an amine having at least two amine groups separated by no more than 5 carbon atoms with the separation being made at a pH of less than 7.0. Thus, the amine should contain at least one —HNRNH— group with R being an aliphatic radical having no more than 5 carbon atoms. R can be acyclic or cyclic and can be branch chain but straight chain compounds are generally preferred. The preferred compounds are acyclic. The compounds should be basic preferably with a basic ionization constant ($K_b$) of at least $1 \times 10^{-4}$ with the ionization constant being discussed e.g. on pages 252–4 of Richter, Textbook of Organic Chemistry (John Wiley, 2d edition). Ordinarily, R will be hydrocarbon radical because negative groups such as halogen atoms detract from the basicity of the amine groups. R can be saturated or unsaturated but saturated radicals are preferred. R can contain from one to 5 carbon atoms but from 2 to 3 or 4 carbon atoms and mixtures are more preferred with excellent results having been obtained where R has 2 carbon atoms. The amine groups may be primary, secondary, tertiary or combinations thereof. One or more of the nitrogen atoms may form a part of a ring as in heterocyclic compounds. Amine compounds wherein there is at least one secondary amine group are especially preferred such as polyalkylene amines. Examples of amines with at least one secondary amine group are triethylenetetraamine and tetraethylenepentamine and mixtures thereof. The amines should have some solubility in water and preferably will have a solubility at 25° C. of at least 1 gram per liter of water.

Examples of suitable amines are such as compounds of the formula $H_2N[RNH]_xH$ wherein R is an aliphatic radical of 1 or 2 to 5 carbon atoms and $x$ is from 1 to 10 or 12 or more and preferably is from 2 to 6. Examples of specific compounds are such as ethylenediamine, diethylenetriamine, triethylenetetramine, tetraethylenepentamine, pentaethylenehexamine, dipropylenetriamine and so forth. The amines may be by product streams from other processes and may contain a mixture of amines. The amines preferably will be biodegradable and preferably will not be significantly toxic to the activated sludge being used for biodegradation.

Polymers of chloroprene, 2-chloro-1,3 butadiene, are polymerized in an aqueous composition in the presence of surface active agents generally referred to as emulsifiers. The term [polymers of chloroprene] encompasses polymers in which chloroprene is the major or predominant monomer. Comonomers may also be employed such as 2,3-dichloro-1,3-butadiene; acrylonitrile, methyl methacrylate and so forth. Usually, the total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization of chloroprene are disclosed, for example in Encyclopedia of Polymer Science and Technology, vol. 3, pages 705–730 (Interscience 1965) and in numerous patents such as U.S. 2,264,173 and U.S. 2,264,191 both issued on Nov. 25, 1941 and these three references are incorporated by reference. The polymerization may be conducted either batch or continuously.

In addition to the salts of the condensation products of naphthalene sulfonic acid and formaldehyde other emulsifiers may also be employed such as the salts of rosins and rosin derivatives such as wood rosin, disproportionated rosin or hydrogenated rosin; ammonium, sodium or potassium salts of long chain fatty acids; non-ionic surface active agents such as the ethylene oxide or propylene oxide condensation products of compounds containing reactive hydrogen atoms. Additional emulsifying agents are disclosed in U.S. 2,264,173. A preferred emulsifier to be used in conjunction with the salts of the condensation product of naphthalene sulfonic acids with formaldehyde are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731–S).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha'-azo-bis-isobutyronitrile and the like. Suitable inorganic peroxides are such as inorganic per acids including per sulfates, perborates or percarbonates, e.g. ammonium or potassium per sulfate and hydrogen peroxide. The catalyst may be used in amounts required to bring about polymerization at any desired rate with suitable ranges being from .001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The salts of the condensation product of naphthalene sulfonic acids with formaldehyde with or without other emulsifiers may be added at any stage during polymerization or may be fed during polymerization or may be added to the water during recovery of polymer such as before or after monomer is removed. However, because the salts of the condensation product of naphthalene sulfonic acids with formaldehyde usually adds stability during polymerization it is preferred to incorporate it into the recipe prior to or during polymerization. Although the amount of salts of the condensation product of naphthalene sulfonic acids with formaldehyde is not critical certain proportions are normally used and within the range of from about .05 to 2.0 parts by weight of this salt compound per 100 parts of polymerizable monomers are usually employed with a preferred range being from about .1 to 1.0 parts per 100 parts of monomer or based on the water from .01 to 3 or 5 parts per 100 parts of water.

The usual modifiers or other agents may be present in the emulsion. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide. Water soluble iron salts e.g. ferrous sulfate or iron chelates may be suitably employed.

Normally, the polymerization would be conducted in an oxygen free or substantially oxygen free atmosphere such as use of an inert gas. However in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 to 90 parcent conversion. The temperature of polymerization may be varied depending upon the particular type of polymer being employed with suitable ranges being from 0° to 90° C. with the preferred range being between 15° C. and 55° C.

The polymerization may be short stopped by the addition of agents such as para-tertiary-butyl catechol and thiodiphenylamine. The process of polymerization may be either continuous or may be conducted in batch.

The naphthalene sulfonic acid condensation salts may be salts of various types such as alkali metal or ammonium salt. Preferred are the sodium, lithium or potassium salts and mixtures thereof with the sodium salts being particularly preferred. A preferred condensation product is the condensation product of an average of about two moles of naphthalene sulfonic acid with one mole of formaldehyde but these ratios can be varied.

After polymerization, the process water containing the condensation product salts may be separated from the chloroprene polymer product by any means and at any stage of the polymerization or recovery of polymer. A conventional method is to coagulate the latices and thereafter remove the water soluble emulsifiers by washing the polymer on a wash belt. These techniques are well known to those skilled in the art of manufacture of neoprene. The process water normally will contain material such as latices, modifiers such as mercaptans, sulfur, short stop agent and rosin base surfactants. This process water may be pretreated to remove any of these compositions or may be treated to concentrate the water such as by settling. However, normally a dilute solution of process water is obtained which contains a minor amount of condensation product salts such as less than 3 percent by weight of the total aqueous composition. Because the condensation product salts are usually washed out with considerable wash water the concentration of the condensation product salts will generally be less than 2 weight percent or less than one percent based on the total aqueous composition.

The process water containing the condensation product salts may be contacted with the polyamine by any suitable means to insure intimate contact. Means for intimately contacting liquids are well known and include such devices as agitators, mixers, pumps, centrifuges, reaction in columns or in filtration equipment and so forth. The temperature of reaction is not critical but greater reaction rates are obtained at higher temperatures, and, therefore, it is normally preferred to have temperatures of at least 0° C. such as from about 0 to 90° C. If the process water is coming fairly directly from the process it will normally be heated to some extent approximating the temperature of polymerization, but it is within the scope of this invention to cool the process water prior to reaction with the amine. The reaction with the amine can be conducted at atmospheric, subatmospheric or superatmospheric pressure but it is normally more convenient to conduct the reaction at approximately atmospheric pressure. The ratio of amine to process water will depend upon such variables of concentration of condensation product salts in the process water, the presence of other materials which will react with the amine, the desired degree of reaction, the desired degree of removal of the condensation product salts, the number and type of amine groups. In general, polyamines having a larger number of amine groups and preferably secondary amine groups are more effective in this reaction and, therefore, can be used in lower percentages. Suitable ratios of amines to condensation product salts are such as from .01 to 10 moles of amine per mole of condensation product salts.

The separation will take place at a pH of 7.0 or less and preferably the pH will be 5.0 or 4.0 or less with excellent results being obtained at pH of about 3.5. Any suitable acid can be used to reduce the pH but the highly ionized acids are more efficient such as those having an ionization constant $K_a$ of at least $1 \times 10^{-4}$. The acid should be one that in the composition in which precipitation is to take place is more highly ionized than the sulfonic acid equivalent to the salt of the condensation product of naphthalene sulfonic acid and formaldehyde. In general, the acid should be more highly ionized than acetic acid with suitable acids being such as hydrochloric, sulfuric, nitric and the like. The pH can be adjusted by mixing the amine and condensation product salts composition to be precipitated and thereafter adding acid to reduce the pH, but a more preferred method is to first reduce the pH of the amine and thereafter add the composition as disclosed and claimed in copending application Ser. No. 182,866 filed by Philip Merchant, Jr. on even date herewith.

The following examples are merely illustrative and are not intended to limit the invention. All percentages are by weight unless expressed otherwise.

EXAMPLE 1

A mercaptan-modified neoprene latex is prepared using the following recipe:

Polymerization charge:     Conc. in parts by weight
- Chloropene _____ 100
- 2,6-ditertiary-butyl para-cresol _____ 0.1
- Resin–721S [1] _____ 4.0
- Lomar PW [2] _____ 0.7
- Deionized water _____ 100
- Sodium hydroxide (100 percent) _____ 0.6
- n-Dodecyl mercaptan (100 percent) _____ 0.235

Initial catalyst:
- Sodium hydrosulfite _____ 0.0294
- Deionized water _____ 0.588

Pumped catalyst:
- .358 percent potassium persulfate in aqueous solution used as required to maintain the polymerization rate.

[1] A disproportionated wood resin, purified by distillation and sold by Hercules Powder Company.
[2] Lomar PW is the sodium salt of the condensation product of naphthalene sulfonic acid with formaldehyde manufactured by Nopco Chemical Co. and is 87 percent by weight actives.

The latex is acidified with acetic acid and thereafter fed to a freeze roll which rotates partly immersed in the latex. This freeze roll is cooled to a temperature of $-15°$ C. by circulating brine. In this process the latex is frozen on the drum and is coagulated as the drum revolves. The coagulated film is stripped from the roll by a stationary knife and is placed on a continuous belt where it is thawed and washed. This process water is then treated with polyamines in accordance with this invention.

The process wash water is treated with Dow Amine Residue E–100 having the following analysis:

| | |
|---|---|
| Ethylenediamine (area percent) | 0.3 |
| Piperazine | 0.8 |
| Diethylenetriamine | 0.8 |
| Aminoethylpiperazine | 1.0 |
| Nitrilo trisethylamine | 0.1 |
| Tetraethylenetriamine | 0.7 |
| Diaminoethyl piperazine | 0.2 |
| Piperazo ethyl ethylenediamine | 0.4 |
| Unknown | 0.4 |
| 4-aminoethyltriethylenetetramine branched | 0.7 |
| Tetraethylenepentamine | 4.4 |
| Aminoethylpiperazinoethylethylenediamine (cyclic) | 1.6 |
| Piperazinoethyldiethylene triamine (cyclic) | 1.8 |
| Pentaethylenehexamine | 45.2 |
| Heavies (higher ethyleneamine polymers) | 41.8 |
| Amine number ring KOH/gm. | 1232 |

The process wash water contains 800 p.p.m. of the condensation product salts (Lomar PW) based on the process wash water. The amine is intimately mixed with the process wash water in an amount of .5 part of amine composition of the analysis shown per 1.0 part of condensation product salts in the process wash water. While the wash water is being agitated, the amine composition is gradually added to the wash water over a period of 30 minutes and, thereafter, the mixture is vigorously agitated with a propeller mixer for one hour during which time the temperature is maintained at 40° C. The pH of the mixture is then lowered to 3.5 by the addition of concentrated sulfuric acid while continuing agitation. The agitation is stopped and the reaction product is allowed to settle out in a settling tank and a dilute solution of reaction product is removed from the bottom of the tank. The clear water overhead is pumped to a bio-oxidative degradation unit pond for further treatment to remove biodegradable components from the water. The slurry from the bottom of the settling tank is evaporated to remove a portion of the water and thereafter incinerated.

EXAMPLES 2–3

The following examples utilize the process of Example 1 with the noted exceptions. The same process water is treated in each instance.

| Polyamine | Acid for pH | Temp. of reaction |
|---|---|---|
| $H_2N(CH_2)_2NH_2$ | 37% HCl | 25° C. |
| $H_2N-CH_2-\underset{\underset{CH_3}{\mid}}{CH}-NH-CH_2-CH_2NH_2$ | 15.6 N HNO$_3$ | 30° C. |

EXAMPLE 4

The process of Example 1 is repeated with the exception that the condensation product salt in an ammonium salt instead of the sodium salt.

EXAMPLES 5–14

A series of examples are run using a 1000 ml. beaker equipped with a Bird Uniform mixer. The process is conducted at approximately 25° C. Five hundred ml. of water solution containing 1000 p.p.m. of the sodium salt of the condensation product of naphthalene sulfonic acid with formaldehyde (Lomar PW) are used and the polyamine is added in the stated amount on the total weight of composition. The amine is added while the solution is being stirred rapidly at 40 r.p.m. Hydrochloric acid is then added to lower the pH to 3.5 and the mixing speed is reduced to 5 r.p.m. to allow the precipitate to agglomerate. The water is poured off of the agglomerate and the percent removal of the condensation product salt from the water is determined by total carbon analysis.

| Polyamine | p.p.m. amine | Percent removal |
|---|---|---|
| Tetraethylenepentamine | 400 | 69 |
| Polyamine spec. H (Union Carbide) | 100 | 68 |
| Dow E-100 (analysis in Example 1) | 100 | 69 |
| Dow BDE-25 1065 | 100 | 63 |
| Dow BC 3565 | 100 | 63 |
| Dow CE 46 | 100 | 67 |
| Dow BE 2575 | 100 | 65 |
| Jefferson AL-7 | 700 | 49 |
| Analine | | (1) |
| Nalco | 700 | 57 |

[1] No precipitate detected.

Although this invention has been particularly described for the separation of condensation product salts from neoprene process water, it can be used also for the separation of condensation product salts from other aqueous compositions wherein the water contains less than 5 percent total solids including the condensation product salts. The invention is useful for the separation of the condensation product salts from other polymerization processes. The examples of other processes are emulsion or suspension polymerization processes such as for butadiene-styrene rubber (GRS) and polyvinylchloride or polyvinylacetate. This invention is not directed to the precipitation of latices but would be useful for the separation of the condensation product salts from the water remaining after the polymer separation step such as an acid coagulation step.

I claim:

1. A process for separating nonbiodegradable emulsifying agents comprised of salts of the condensation product of naphthalene sulfonic acids and formaldehyde from process water derived from an aqueous polymerization and recovery of chloroprene polymers process utilizing said emulsifying agents which consists essentially of:

contacting the process water containing said salts with a polyalkylene amine of the formula $$H_2N[-R-NH]_xH$$

wherein R is aliphatic and has from 1 to 5 carbon atoms and $x$ is from 1 to 12 to form a mixture;

thereafter reducing the pH of said mixture to a pH of less than 5.0 by the addition of an acid to said mixture; and separating the resulting precipitate from said process water.

2. The process of claim 1 wherein said amine comprises a polyalkylene amine of the formula $$H_2N[-R-NH]_xH$$

wherein R is aliphatic and has from 2 to 3 carbon atoms and $x$ is from 2 to 10.

3. The process of claim 1 wherein the said amine is ethylene diamine.

4. The process of claim 1 wherein the said amine is a compound of the formula $H_2N-[C_2H_4NH]_xH$ wherein $x$ is from 2 to 10 and mixtures thereof.

5. The process of claim 4 wherein $x$ is from 2 to 6 and mixtures thereof.

6. The process of claim 1 wherein the said pH is achieved by use of an acid having an ionization constant $K_a$ of at least $1 \times 10^{-4}$.

7. The process of claim 1 wherein the said amine has a basic ionization constant $K_b$ of at least $1 \times 10^{-4}$.

8. The process of claim 1 wherein the said amine has a solubility in water at 25° C. of at least 1 gram per liter.

9. The process of claim 1 wherein the said amine is a mixture of polyethyleneamines.

10. The process of claim 1 wherein the said salt is an alkali metal salt.

11. The process of claim 1 wherein the said salt is a sodium salt.

12. The process of claim 1 wherein the said salt comprises the sodium salt of the condensation of about two moles of naphthalene sulfonic acid with one mole of formaldehyde.

13. The process of claim 1 wherein the said salt is present in an amount of no greater than 5 weight percent of said process water.

14. The process of claim 1 wherein the pH is controlled by use of an acid selected from the group consisting of hydrochloric acid, sulfuric acid, nitric acid and mixtures thereof.

15. The process of claim 1 wherein the said amine has at least one secondary amine, nitrogen.

16. The process of claim 1 wherein the said process water additionally contains rosin compounds.

17. The process of claim 1 wherein the said pH is no greater than 4.0.

18. The process of claim 1 wherein the said process water is obtained from a mixture of water used for the polymerization medium and water used as wash water from washing of polymer recovered by freeze roll.

References Cited

UNITED STATES PATENTS

| 2,505,226 | 4/1950 | Barrows | 260—27 BB |
| 2,347,576 | 4/1944 | Ogilby | 210—54 X |
| 3,483,174 | 12/1969 | Libengood et al. | 260—821 X |
| 2,604,467 | 7/1952 | Crouch et al. | 260—822 |
| 3,372,129 | 3/1968 | Phillips | 210—54 X |
| 1,797,192 | 3/1931 | Graci a | 260—821 |
| 2,446,115 | 7/1948 | Svendsen | 260—822 |

SAMIH N. ZAHARNA, Primary Examiner

T. G. WYSE, Assistant Examiner

U.S. Cl. X.R.

210—54